US012229869B2

(12) United States Patent
Akenine-Moller et al.

(10) Patent No.: US 12,229,869 B2
(45) Date of Patent: Feb. 18, 2025

(54) TECHNIQUES FOR TEXTURE FILTERING USING REFRACTED RAY CONES

(71) Applicant: NVIDIA CORPORATION, Santa Clara, CA (US)

(72) Inventors: Tomas Akenine-Moller, Lund (SE); Jakub Boksansky, Munich (DE)

(73) Assignee: NVIDIA CORPORATION, Santa Clara, CA (US)

( * ) Notice: Subject to any disclaimer, the term of this patent is extended or adjusted under 35 U.S.C. 154(b) by 73 days.

(21) Appl. No.: 17/329,737

(22) Filed: May 25, 2021

(65) Prior Publication Data

US 2022/0237852 A1 Jul. 28, 2022

Related U.S. Application Data

(60) Provisional application No. 63/141,355, filed on Jan. 25, 2021.

(51) Int. Cl.
*G06T 15/06* (2011.01)
*A63F 13/52* (2014.01)
*G06T 15/04* (2011.01)

(52) U.S. Cl.
CPC .............. *G06T 15/06* (2013.01); *A63F 13/52* (2014.09); *G06T 15/04* (2013.01); *G06T 2210/04* (2013.01)

(58) Field of Classification Search
CPC ..... G06T 15/04; G06T 15/06; G06T 2210/04; A63F 13/52
See application file for complete search history.

(56) References Cited

U.S. PATENT DOCUMENTS

2019/0234585 A1* 8/2019 Le Corre ............... F21S 43/26
2019/0236831 A1* 8/2019 Akenine-Moller ... G06T 11/001

FOREIGN PATENT DOCUMENTS

WO WO1997034213 A2 * 9/1997

OTHER PUBLICATIONS

Amanatides, Ray Tracing with Cones, ACM SIGGRAPH Computer Graphics, vol. 18, Issue 3, Jul. 1984, pp. 129-135 (Year: 1984).*
Igehy, Tracing Ray Differentials, ACM SIGGRAPH 99, pp. 179-186 (Year: 1999).*
Tomas Akenine-Moller et al, Texture Level-of-Detail Strategies for Real-Time Ray Tracing, URL: https://developer.nvidia.com/raytracinggems (Year: 2019).*
Fitzpatrick, Law of Refraction, URL: https://farside.ph.utexas.edu/teaching/316/lectures/node128.html (Year: 2007).*
Akenine-Möller et al., "Improved Shader and Texture Level of Detail Using Ray Cones", Journal of Computer Graphics Techniques, vol. 10, No. 1, ISSN 2331-7418, http://jcgt.org/published/0010/01/01/, 2021, pp. 1-24.
Akenine-Möller et al., "Texture Level of Detail Strategies for Real-Time Ray Tracing", Ray Tracing Gems, Chapter 20, 2019, pp. 321-345.

(Continued)

*Primary Examiner* — Phuc N Doan
(74) *Attorney, Agent, or Firm* — Artegis Law Group, LLP

(57) ABSTRACT

One embodiment of a method rendering one or more graphics images includes tracing a ray cone through a three-dimensional (3D) graphics scene, generating a refracted ray cone based on the ray cone and a two-dimensional (2D) coordinate frame, and rendering a graphics image based on the refracted ray cone.

19 Claims, 11 Drawing Sheets

(56) References Cited

OTHER PUBLICATIONS

Belcour et al., "Antialiasing Complex Global Illumination Effects in Path-Space", ACM Transactions on Graphics, vol. 36, No. 1, Article 9, https://doi.org/10.1145/2990495, 2017, pp. 9:1-9:13.

Benty et al., "The Falcor Rendering Framework", Retrieved from https://github.com/NVIDIAGameWorks/Falcor, on Sep. 15, 2021, 2017, 4 pages.

Greve, Bram de, "Reflections and Refractions in Ray Tracing", Retrieved from https://graphics.stanford.edu/courses/cs148-10-summer/docs/2006-degreve--reflection_refraction.pdf, Nov. 13, 2006, pp. 1-6.

Elek et al., "Spectral Ray Differentials", Computer Graphics Forum, Eurographics Symposium on Rendering 2014, vol. 33, No. 4, DOI: 10.1111/cgf.12418, Oct. 2014, pp. 113-122.

Heitz, Eric, "Sampling the GGX Distribution of Visible Normals", Journal of Computer Graphics Techniques, vol. 7, No. 4, ISSN 2331-7418, 2018, pp. 1-13.

Igehy, Homan, "Tracing Ray Differentials", Computer Science Department in Proceedings of SIGGRAPH 99, 1999, pp. 179-186.

Stam, Jos, "An Illumination Model for a Skin Layer Bounded by Rough Surfaces", In Eurographics Workshop on Rendering, 2001, 15 pages.

Walter et al., "Microfacet Models for Refraction through Rough Surfaces", Eurographics Symposium on Rendering Techniques, 2007, pp. 195-206.

International Search Report for application No. PCT/US2022/013289 dated May 25, 2022.

Kirk, David B., "The simulation of natural features using cone tracing", The Visual Computer, DOI: 10.1007/BF02153662, vol. 3, 1987, pp. 63-71.

* cited by examiner

TECHNIQUES FOR TEXTURE FILTERING USING REFRACTED RAY CONES

CROSS-REFERENCE TO RELATED APPLICATIONS

This application claims the priority benefit of United States provisional patent application titled, "Texture Filtering Techniques for Refracted Ray Cones," filed Jan. 25, 2021, and having Ser. No, 63/141,355. The subject matter of this related application is hereby incorporated herein by reference.

BACKGROUND

Technical Field

Embodiments of the present disclosure relate generally to computer science and computer graphics and, more specifically, to techniques for texture filtering using refracted ray cones.

Description of the Related Art

In three-dimensional (3D) computer graphics, ray tracing is a popular technique for rendering images, such as the frames of a movie or video game. Ray tracing techniques trace the paths of light rays and simulate the effects of those light rays interacting with virtual objects within a virtual scene. Ray cone tracing techniques are similar to ray tracing techniques, except ray cone tracing techniques trace cones, instead of rays, through a scene. Ray cone tracing techniques can solve various sampling and aliasing problems that negatively impact conventional ray tracing techniques. In addition, ray cone tracing techniques are less computationally expensive than some notable ray tracing techniques, such as differential ray tracing and covariance tracing.

Refraction is a change in the direction of light when light passes from one medium to another medium, and the two media have different indices of refraction. The index of refraction of a particular medium is related to the speed of light passing through that medium, which depends on a density of the medium. For example, light will bend in one direction when passing from air into a denser medium, such as glass, and bend in the opposite direction when passing from the denser medium into air.

Currently, there are no ray cone tracing techniques that reasonably simulate refraction of light within a virtual scene. As a result, images rendered using current ray cone tracing techniques can appear unrealistic when the virtual scenes from which the images are rendered include objects constructed from media that cause light to refract.

As the foregoing illustrates, what is needed in the art are more effective techniques for rendering graphics scenes using ray cone tracing.

SUMMARY

One embodiment of the present disclosure sets forth a computer-implemented method for rendering one or more images. The method includes tracing a ray cone through a three-dimensional (3D) graphics scene. The method further includes generating a refracted ray cone based on the ray cone and a two-dimensional (2D) coordinate frame. In addition, the method includes rendering a graphics image based on the refracted ray cone.

Other embodiments of the present disclosure include, without limitation, one or more computer-readable media including instructions for performing one or more aspects of the disclosed techniques as well as one or more computing systems for performing one or more aspects of the disclosed techniques.

At least one technological advantage of the disclosed techniques relative to the prior art is that the disclosed techniques implement refracted ray cones that can be used to render more realistic-looking images of virtual scenes that include objects constructed from media that cause light to refract. In addition, the disclosed techniques use ray cone tracing, which is less computationally expensive than many ray tracing techniques, such as differential ray tracing, that can be used to trace refracted rays. These technological advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
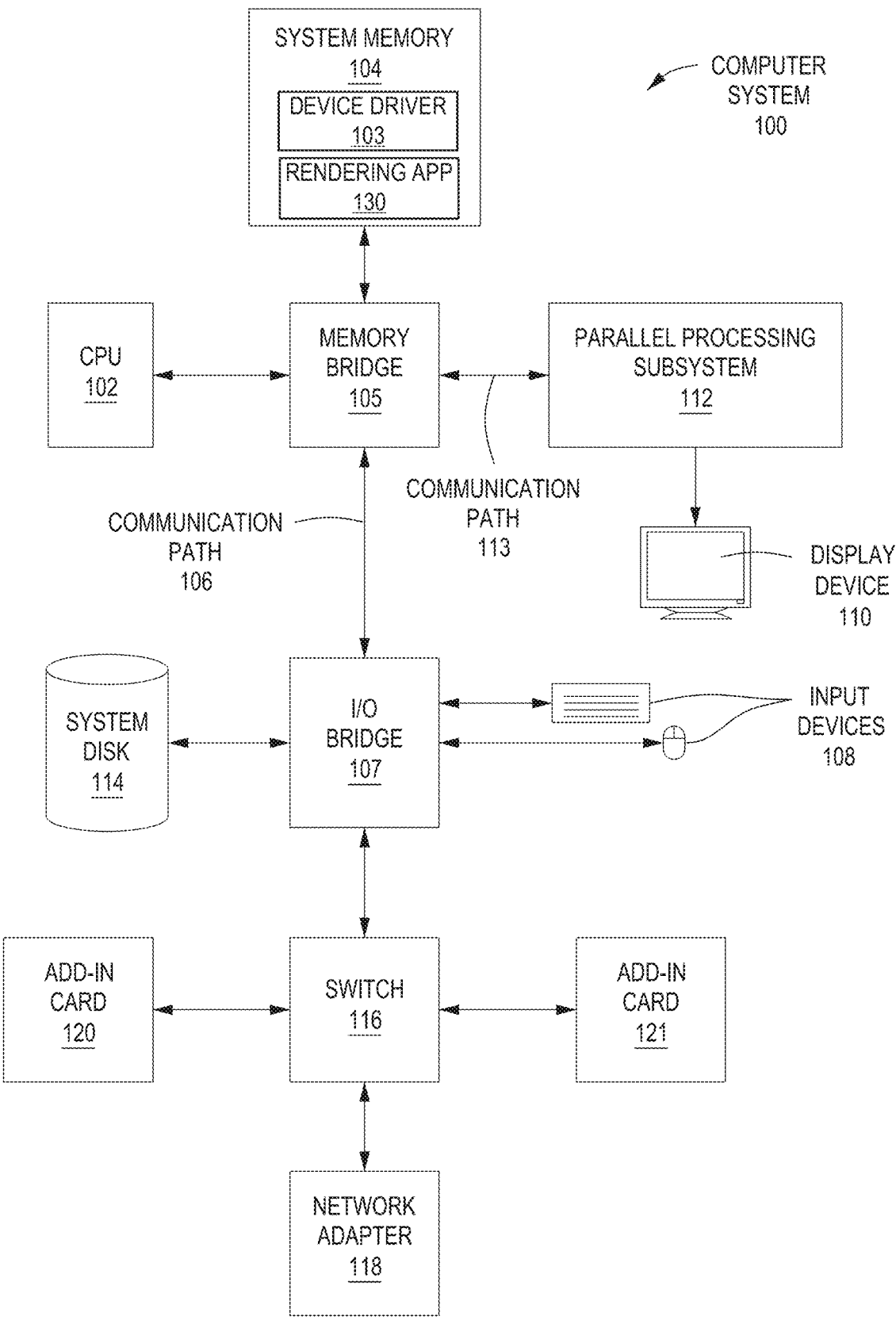
FIG. 1 is a block diagram illustrating a computer system configured to implement one or more aspects of the present embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved ray cone tracing techniques that implement refracted ray cones. The improved ray cone tracing techniques have many real-world applications, including video games, film production rendering, architectural and design applications, and any other applications in which images can be rendered using ray cone tracing. In the improved ray cone tracing techniques, when a ray cone being traced through a virtual three-dimensional (3D) scene hits a surface of geometry within the scene and undergoes refraction, a refracted ray cone is generated by (1) computing, in a two-dimensional (2D) coordinate frame, the direction of a middle ray of the refracted ray cone and the directions of upper and lower sides of the refracted ray cone; and (2) given such computations, further computing a width of the refracted ray cone and a spread angle of the refracted cone. The refracted ray cone is then traced through the scene. In addition, isotropic texture filtering can be performed prior to generating the refracted ray cone, and anisotropic texture filtering can be performed using the refracted ray cone and any subsequent ray cones, to determine the color of a pixel in a rendered image.

The ray cone tracing techniques of the present disclosure have many real-world applications. For example, the ray cone tracing techniques can be used to efficiently render images and/or frames within a video game. As a particular example, the ray cone tracing techniques could be performed by a cloud-based graphics processing platform, such as a cloud-based gaming platform, that executes video games and streams videos of game sessions to client devices. The disclosed ray cone tracing techniques are more computationally efficient and/or can render more realistic images than some other techniques, such as differential ray tracing techniques, conventional ray cone tracing techniques, and rasterization-based techniques.

As another example, the ray cone tracing techniques can be used in the production-quality rendering of films. The production of animated films as well computer-generated imagery (CGI) and special effects within live action films, often requires high-quality rendering of frames of those films. The disclosed ray cone tracing techniques can be used to render the frames of a film more efficiently and/or correctly than some other techniques, such as differential ray tracing techniques and conventional ray cone tracing techniques.

As yet another example, the disclosed ray cone tracing techniques can be used to render the designs of architectural structures and other objects. Architectural and design applications oftentimes provide renderings to show the appearances of particular designs in real life. The disclosed ray cone tracing techniques can be used to more efficiently and/or correctly render images of designs than some other techniques, such as differential ray tracing techniques and conventional ray cone tracing techniques.

The above examples are not in any way intended to be limiting. As persons skilled in the art will appreciate, as a general matter, the ray cone tracing techniques described herein can be implemented in any application where convention ray tracing and/or ray cone tracing techniques are currently employed.

System Overview

FIG. 1 is a block diagram illustrating a computer system 100 configured to implement one or more aspects of the present embodiments. As persons skilled in the art will appreciate, computer system 100 can be any type of technically feasible computer system, including, without limitation, a server machine, a server platform, a desktop machine, laptop machine, a hand-held/mobile device, or a wearable device. In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112. In addition, the system memory 104 includes a rendering application 130. The rendering application 130 can be any technically-feasible application that renders virtual 3D scenes via ray cone tracing techniques disclosed herein. For example, the rendering application 130 could be a gaming application or a rendering application that is used in film production. Although described herein primarily with respect to the rendering application 130, techniques disclosed herein can also be implemented, either entirely or in part, in other software and/or hardware, such as in the parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in some embodiments. For example, the parallel processing subsystem 112 could be implemented as a virtual graphics processing unit (GPU) that renders graphics on a virtual machine (VM) executing on a server machine whose GPU and other physical resources are shared across multiple VMs.

Figure 2:
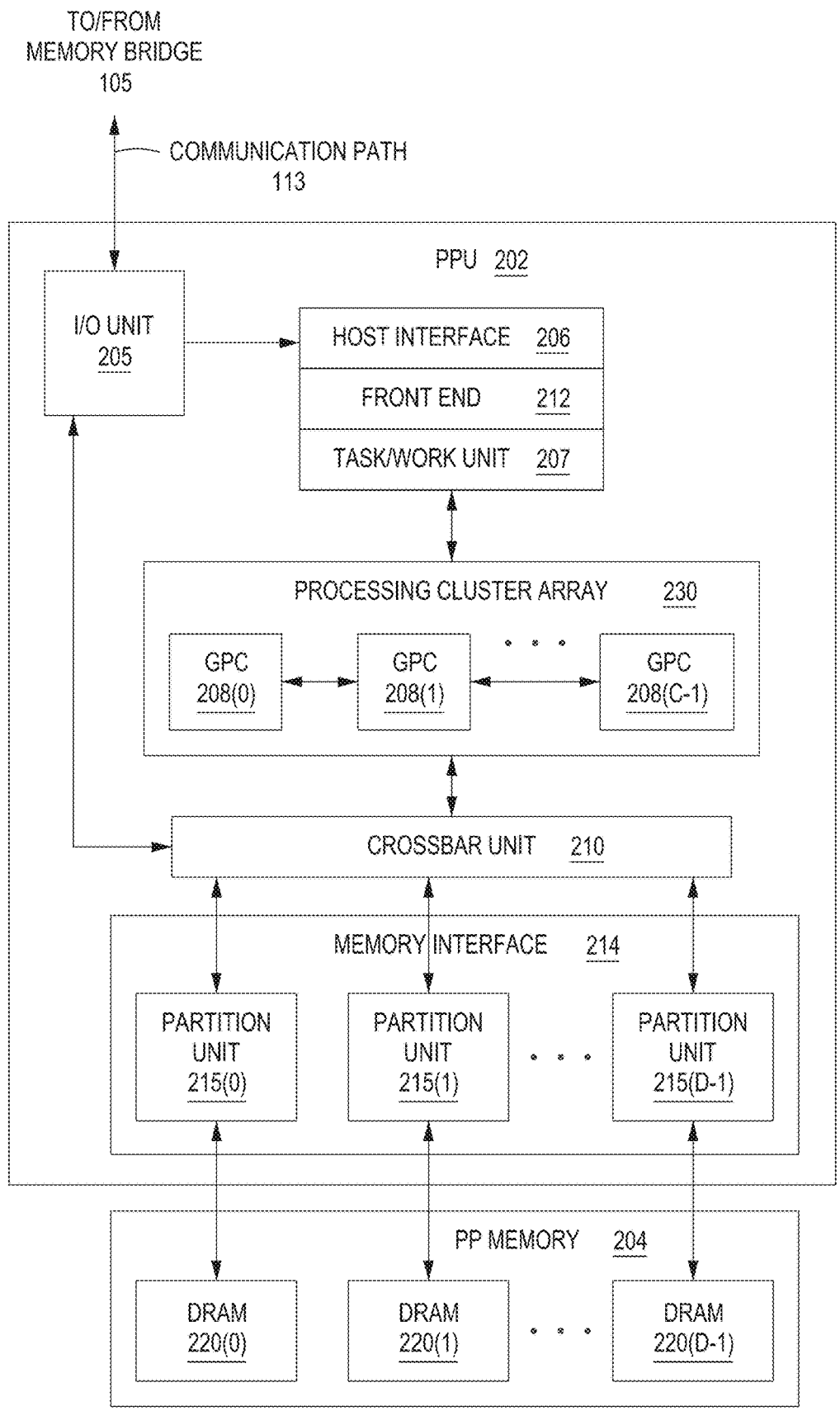
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a GPU that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also, for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, wearable devices, servers, workstations, game consoles, embedded systems, and the like.

Figure 3:
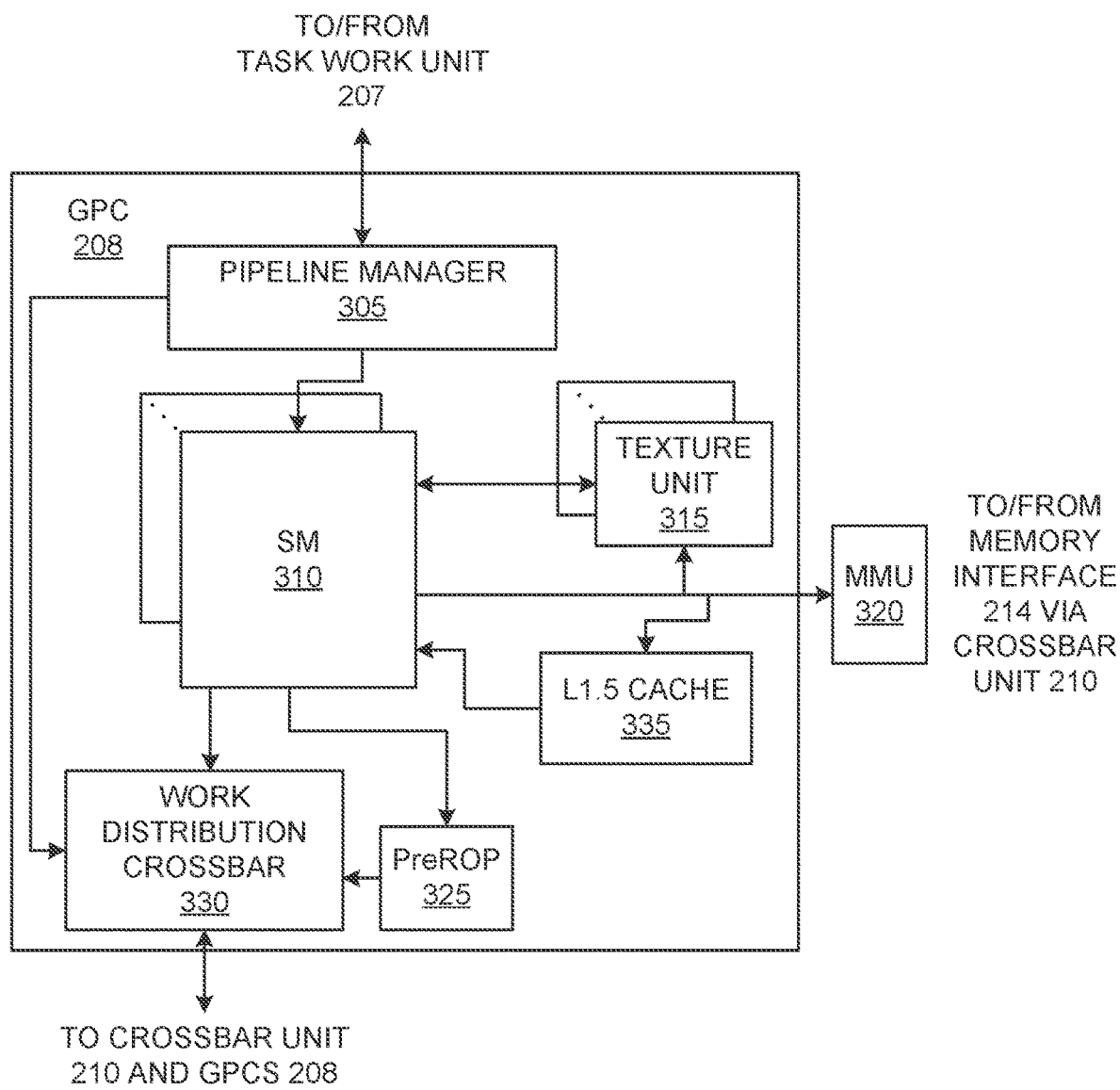
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Figure 4:
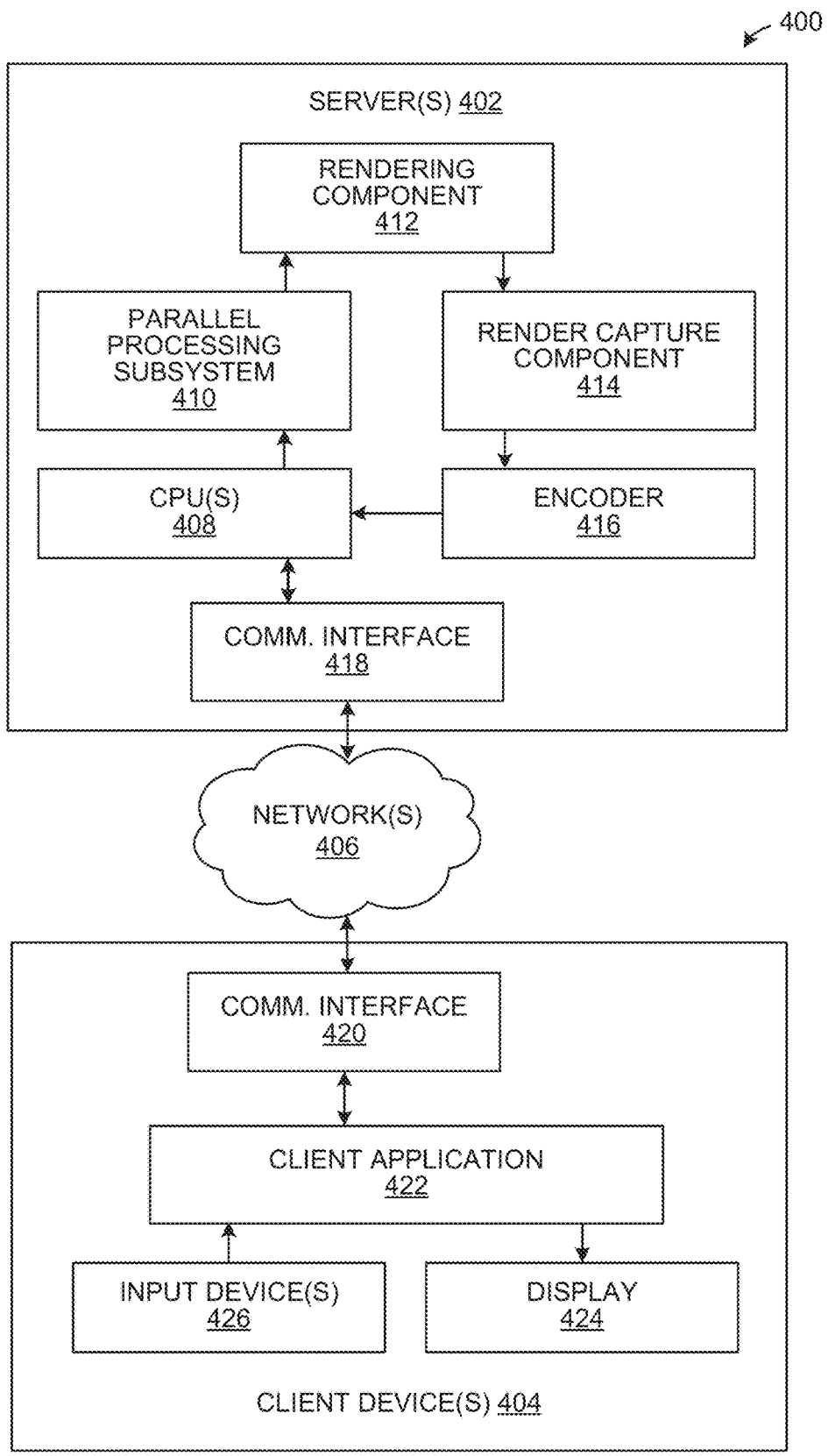
FIG. 4 is a block diagram illustrating an exemplar cloud computing system, according to various embodiments.

FIG. 4 is a block diagram illustrating an exemplar cloud computing system, according to various embodiments. As shown, a computing system 400 includes server(s) 402 that are in communication with client device(s) 404 via network(s) 406. Each of the server(s) 402 may include similar components, features, and/or functionality as the exemplary computer system 100, described above in conjunction with FIG. 1-3. Each of the server(s) 402 may be any technically feasible type of computer system, including, without limitation, a server machine or a server platform. Each of the client devices(s) 402 may also include similar components, features, and/or functionality as the computer system 100, except each client device 402 executes a client application 422 rather than the rendering application 130. Each of the client device(s) 402 may be any technically feasible type of computer system including, without limitation, a desktop machine, a laptop machine, a hand-held/mobile device, and/or a wearable device. In some embodiments, one or more of the server(s) 402 and/or the client device(s) 404 may be replaced with virtualized processing environment(s), such as virtualized processing environment(s) provided by one or more VMs and/or containers that execute on underlying hardware system(s). The network(s) 406 may include any type of network(s), such as one or more local area networks (LANs) and/or wide area networks (WANs) (e.g., the Internet).

In some embodiments, the server(s) 400 may be included in a cloud computing system, such a public cloud, a private cloud, or a hybrid cloud, and/or in a distributed system. For example, the server(s) 400 could implement a cloud-based gaming platform that provides a game streaming service, also sometimes referred to as "cloud gaming," "gaming on demand," or "gaming-as-a-service." In such a case, games that are stored and executed on the server(s) 400 are streamed as videos to the client device(s) 402 via client application(s) 422 running thereon. During game sessions, the client application(s) 422 handle user inputs and transmit those inputs to the server(s) 400 for in-game execution. Although cloud-based gaming platforms are described herein as a reference example, persons skilled in the art will appreciate that, as a general matter, the server(s) 400 may execute any technically feasible types of application(s), such as the design applications described above.

As shown, each of the client device(s) 404 includes input device(s) 426, the client application 422, a communication interface 420, and a display 424. The input device(s) 426 may include any type of device(s) for receiving user input, such as a keyboard, a mouse, a joystick, and/or a game controller. The client application 422 receives input data in response to user inputs at the input device(s) 426, transmits the input data to one of the server(s) 402 via the communication interface 420 (e.g., a network interface controller) and over the network(s) 406 (e.g., the Internet), receives encoded display data from the server 402, and decodes and causes the display data to be displayed on the display 424 (e.g., a cathode ray tube, liquid crystal display, light-emitting diode display, or the like). As such, more computationally intense computing and processing can be offloaded to the server(s) 402. For example, a game session could be streamed to the client device(s) 404 from the server(s) 402, thereby reducing the requirements of the client device(s) 404 for graphics processing and rendering.

As shown, each of the server(s) 402 includes a communication interface 418, CPU(s) 408, a parallel processing subsystem 410, a rendering component 412, a render capture component 414, and an encoder 416. Input data transmitted by the client device 404 to one of the server(s) 402 is received via the communication interface 418 (e.g., a network interface controller) and processed via the CPU(s) 408 and/or the parallel processing subsystem 410 included in that server 402, which correspond to the CPU 102 and the parallel processing subsystem 112, respectively, of the computer system 100 described above in conjunction with FIGS. 1-3. In some embodiments, the CPU(s) 408 may receive the input data, process the input data, and transmit data to the parallel processing subsystem 410. In turn, the parallel processing subsystem 410 renders one or more standalone images and/or image frames, such as the frames of a video game, based on the transmitted data.

Illustratively, the rendering component 412 employs the parallel processing subsystem 112 to render the result of processing the input data, and the render capture component 414 captures the rendering as display data (e.g., as image data capturing standalone image(s) and/or image frame(s)). The rendering performed by the rendering component 412 may include ray- or path-traced lighting and/or shadow effects, computed using one or more parallel processing units—such as GPUs, which may further employ the use of one or more dedicated hardware accelerators or processing cores to perform ray or path-tracing techniques—of the server 402. In some embodiments, the rendering component 412 performs rendering using the ray cone tracing techniques disclosed herein. Thereafter, the encoder 416 encodes display data capturing the rendering to generate encoded display data that is transmitted, over the network(s) 406 via the communication interface 418, to the client device(s) 422 for display to user(s). In some embodiments, the rendering component 412, the render capture component 414, and the encoder 416 may be included in the rendering application 130, described above in conjunction with FIG. 1.

Returning to the example of cloud gaming, during a game session, input data that is received by one of the server(s) 402 may be representative of movement of a character of the user in a game, firing a weapon, reloading, passing a ball, turning a vehicle, etc. In such a case, the rendering component 412 may generate a rendering of the game session that is representative of the result of the input data, and the render capture component 414 may capture the rendering of the game session as display data (e.g., as image data capturing rendered frames of the game session). Parallel processing (e.g., GPU) resources may be dedicated to each game session, or resource scheduling techniques may be employed to share parallel processing resources across multiple game sessions. In addition, the game session may be rendered using the ray cone tracing techniques disclosed herein. The rendered game session may then be encoded, by the encoder 416, to generate encoded display data that is transmitted over the network(s) 406 to one of the client device(s) 404 for decoding and output via the display 424 of that client device 404.

It will be appreciated that the architecture described herein is illustrative and that variations and modifications are possible. Among other things, any number of processing units, such as the SMs 310, texture units 315, or preROP units 325, described above in conjunction with FIG. 3, may be included within GPC 208.

Texture Filtering Using Refracted Ray Cones

Figure 5:
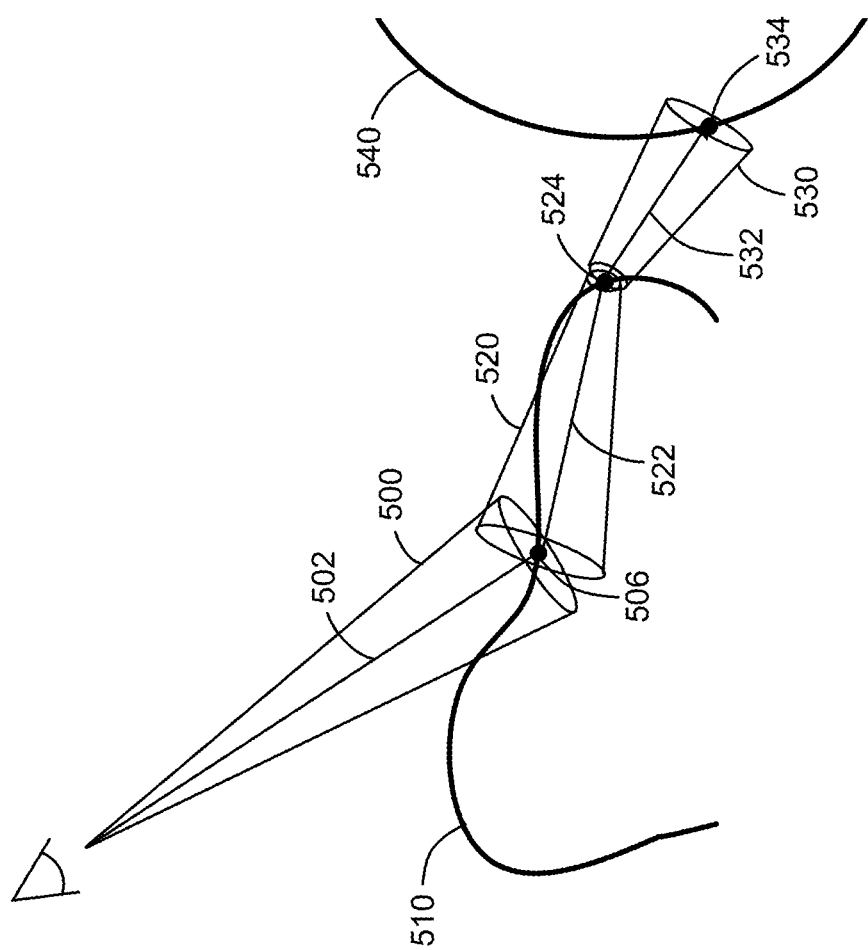
FIG. 5 illustrates an exemplar ray cone being traced through a virtual three-dimensional scene, according to various embodiments.

FIG. 5 illustrates an exemplar ray cone being traced through a virtual three-dimensional scene, according to various embodiments. As shown, a ray cone 500, which is an augmentation to a ray 502, is traced through a pixel (not shown) in a screen space into a scene that includes two objects 510 and 540. When the ray cone 500 hits an object at a hit point, the ray cone 500 can reflect or refract depending on material properties of the object and a surface curvature at the hit point.

As shown, the object 510 is constructed from a medium that refracts the ray cone 500 that is incident on the object 510, and the object 540 is constructed from a medium that does not reflect or refract a ray cone 530. For example, the object 510 could be constructed from glass, and the object 540 could be constructed from concrete.

Illustratively, the rendering application 130 traces the ray cone 500 to a hit point 506 on the object 510 and performs a texture filtering lookup based on a texture footprint associated with the ray cone 500 and a texture of a surface of the object 510. In some embodiments, performing the texture filtering lookup includes instructing a texture unit of a GPU (e.g., the texture unit 315 described above in conjunction with FIG. 3) to perform texture filtering at the hit point 506 based on the texture of the object 510 at the hit point 506 and a texture footprint corresponding to a size of the ray cone 500 at that hit point 506. For example, the intersection of the ray cone 500 with a triangle plane, which is the plane passing through vertices of a triangle at the hit point 506, forms an ellipse that could be used as a texture footprint during texture filtering. In particular, the rendering application 130 could input the major and minor axes of such an ellipse into a hardware-accelerated texture lookup unit of a GPU that performs texture filtering based on those axes. Although described herein primarily with respect to texture filtering, in some cases, textures may be sampled without performing texture filtering. For example, when the very first hit of a ray cone along a path is refractive, no texture filtering could be performed prior to the refraction.

After performing the texture filtering lookup (or texture sampling), the rendering application 130 generates and traces a refracted ray cone 520 to a hit point 524 on another side of the object 510. It should be noted that generating a refracted ray cone is different from generating a reflected ray cone, because the indices of refraction are typically different for two media on opposing sides of a hit point surface in the case of refraction, whereas the indices of refraction are typically the same in the case of reflection. In the case of refraction, the relative index of refraction, η, of the two media can impact the direction of a refracted ray, which can change not only the width of a refracted ray cone, but also a geometry of the refracted ray cone. Depending on the relative index of refraction (whether a ray refracts from an optically denser to an optically thinner medium, or vice versa), the refracted ray cone can either shrink or grow. In addition, the centerline of a refracted ray cone can generally differ from the direction of a refracted ray generated by refracting a middle ray of an incident ray cone. However, as described in greater detail below, some embodiments do not alter the refracted ray to reflect such a change, because doing so would be more computationally expensive and could miss geometry that would be hit under certain angles.

In some embodiments, the rendering application 130 generates the refracted ray cone 520 by computing, in a 2D coordinate frame, the direction of a middle ray of the refracted ray cone 520 and the directions of upper and lower sides of the refracted ray cone 520, and given such computations, further computing a width and a spread angle of the refracted cone 520, as described below in conjunction with FIGS. 6-11. After tracing the refracted ray cone 520 to the hit point 524, the rendering application 130 performs another texture filtering lookup based on a texture footprint associated with the refracted ray cone 520 and a texture of the surface of the object 512. In some embodiments, isotropic texture filtering is performed prior to refractions, and anisotropic texture filtering is performed after refractions, such as when the refracted ray cone 520 hits the other side of the object 510 at the hit point 524. Anisotropic texture filtering, which is more computationally expensive than isotropic texture filtering, can be used to correct imperfections in the reflected ray cone 520, as described below in conjunction with FIG. 7. In other embodiments, only isotropic texture filtering may be performed.

As shown, the rendering application 130 generates and traces another refracted ray cone 530 to a hit point 534 on the object 540. The refracted ray cone 530 can be generated in a similar manner as the refracted ray cone 520. Then, the rendering application 130 performs another texture filtering lookup based on a texture footprint associated with the refracted ray cone 530 and a texture of the surface of the object 540. Similar to the description above, anisotropic texture filtering can be performed in some embodiments.

Results of the texture filtering lookups, described above, can be used to render, on the surface of the object 510, a combination of the textures associated with the surface of the object 510 at the hit points 506 and 524 and the texture associated with the surface of the object 540 at the hit point 534.

Figure 6:
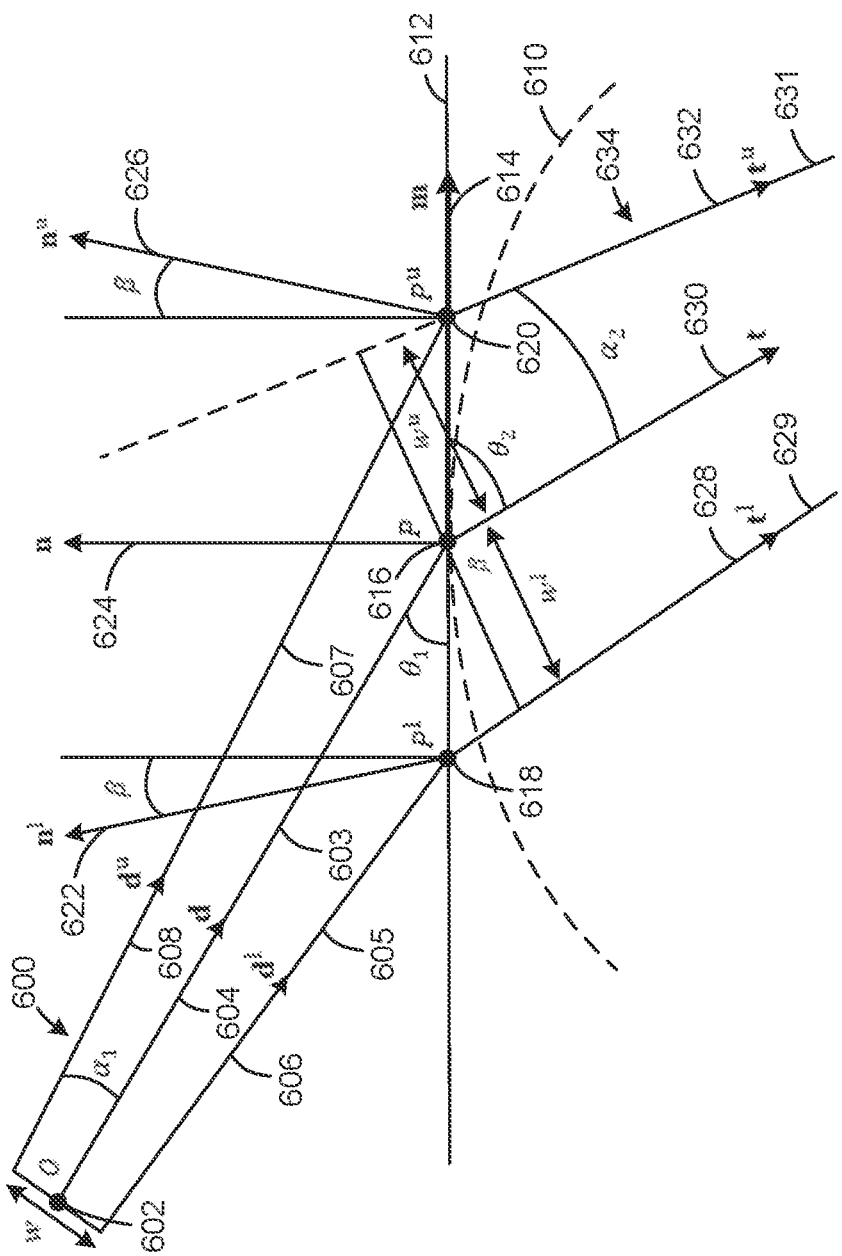
FIG. 6 illustrates an approach for computing refracted ray cones, according to various embodiments.

FIG. 6 illustrates an approach for computing refracted ray cones, according to various embodiments. As shown, a ray cone 600 can be defined by an origin 602, denoted by O; an initial width, denoted by w; a spread angle, denoted by $\alpha_1$, that indicates how wide the ray cone 600 grows as a middle ray 603 of the ray cone 600 traverses a scene; and a direction vector 604, denoted by d, that indicates a direction of the middle ray 603. Illustratively, the ray cone 600 hits an object 610 having a curved surface at a hit point 616, denoted by P. The ray cone 600 is then refracted as a refracted ray cone 634.

In some embodiments, the rendering application 130 generates the refracted ray cone 634 by first computing, in a 2D coordinate frame, (1) a direction vector 630, denoted by t, that indicates the direction of a middle ray of the refracted ray cone 634; (2) an upper direction vector 632, denoted by $t^u$, that is associated with one side of the refracted ray cone 634 in 2D; and (3) a lower direction vector 628, denoted by $t^l$, that is associated with another side of the refracted ray cone 634 in 2D. The rendering application 130 then computes a width of the refracted ray cone 634 based on distances from the hit point 616, P, to lines 631 and 629 defined by the upper direction vector 632, $t^u$, and the lower direction vector 628, $t^l$, respectively, along a direction orthogonal to the direction vector 630, t. In addition, the rendering application 130 can compute a half cone angle, denoted by $\alpha_2$, of the refracted ray cone 634 based on the upper direction vector 632, $t^u$, and the lower direction vector 628, $t^l$.

More formally, the curvature of the surface 610 at the hit point 616, P, can be modeled as a signed angle, denoted by β, that is positive if the surface 610 is convex at the hit point 616, P, and negative if the surface is concave at the hit point 616, P. A rotated normal vector 622, denoted by $n^l$, at a point 618, denoted by $P^l$, and a rotated normal vector 626, denoted by $n^u$, at another hit point 620, denoted by $P^u$, can then be obtained by rotating, in opposite directions by the angle β, a vector 624, denoted by n, that is normal to the surface of the object at the hit point 616, P. As described, computations to generate the refracted ray cone 634, including determining the rotated normal vectors 622, $n^l$, and 626, $n^u$, can be performed in two dimensions. In some embodiments, a 2D coordinate frame is defined using the hit point 616, P, as an origin of the 2D coordinate frame, a direction of the vector 624, n, that is normal to the surface of the object 610 as a y-axis, and a direction of a tangent vector 614, denoted by m, that is orthogonal to the normal vector 624, n, and parallel to the direction vector 604, d (along a plane of the drawing).

In some embodiments, the tangent vector 614, m, can be computed using a projection and normalization, as follows:

$$m = \frac{d - (n \cdot d)n}{\|d - (n \cdot d)n\|}. \tag{1}$$

Together, the normal vector 624, n, and the tangent vector 614, m, form the basis vectors of a plane. The following discussion assumes that all vectors and points are in the 2D coordinate frame described above.

In some embodiments, the upper direction vector 608, $d^u$, is obtained by rotating the direction vector 604, d, associated with the middle ray 603 of the ray cone 600 by the spread angle +α of the ray cone 600. Similarly, the lower direction vector 606, $d^l$ can be obtained by rotating the direction vector 604, d, by minus the spread angle −α. As shown, an upper ray 607 that is associated with one side of the ray cone 600 has a direction indicated by the upper direction vector 608, $d^u$, and the upper ray 605 starts from the origin 602, O, offset by half the initial width w/2 in a direction orthogonal to the direction vector 604, d. Similarly, a lower ray 605 that is associated with another side of the ray cone 600 has a direction indicated by the lower direction vector 606, $d^l$, and the lower ray 605 starts from the origin 602, O, offset by half the initial width w/2 in an opposite direction from the upper direction vector 608, $d^u$, that is orthogonal to the direction vector 604, d. The upper and lower rays 607 and 605 are traced through the scene, until the upper and lower rays 607 and 605 intersect with the x-axis of the 2D coordinate frame at point $P^u$ and $P^l$, respectively.

Given the direction vector 604, d, associated with the incident ray, the rendering application 130 determines whether refraction should occur. In some embodiments, whether refraction occurs is determined based on whether an angle of incidence that a ray makes with the surface of the object 610 is greater than a critical angle associated with a medium of the object 610 and a medium surrounding the object 610. Beyond the critical angle, total internal reflection can occur, rather than refraction, if a ray is attempting to travel from an optically denser medium to an optically thinner medium.

When refraction occurs, the rendering application 130 computes a direction vector 630, t, an upper direction vector 632, $t^u$, and a lower direction vector 632, $t^l$, associated with the refracted ray cone 634. In particular, the direction vector 630, t, can be computed based on the direction vector 604, d, associated with the middle ray 603 of the ray cone 600 and the indices of refraction of the media on either side of the hit point 616, P, using Snell's law:

$$n_1 \sin \theta_1 = n_2 \sin \theta_2, \tag{2}$$

where $n_1$ and $n_2$ are the indices of refraction of the two media, $\theta_1$ is the incident angle of the middle ray 603 of the ray cone 600, and $\theta_2$ is the refracted angle of a middle ray of the refracted ray cone 634. The upper direction vector 632, $t^u$, can be computed using Snell's law based on an upper direction vector 608, denoted by $d^u$, that is associated with one side of the ray cone 630; the indices of refraction, $n_1$ and $n_2$, of the media on either side of the hit point 616, P; and a rotated normal vector 626, denoted by $n^u$, that is computed based on a curvature of the surface of the object 610 at the hit point 616, P. In particular, the refracted angle ($\theta_2$ in equation (2)) of the upper direction vector 632, $t^u$, can be computed with respect to the rotated normal vector 626, $n^u$. Similarly, the lower direction vector 632, $t^l$, can be computed using Snell's law based on a lower direction vector 606, denoted by $d^l$, that is associated with another side of the ray cone 630; the indices of refraction, $n_1$ and $n_2$, of the media on either side of the hit point 616, P; and a rotated normal vector 622, denoted by $n^l$, that is computed based on a curvature of the surface of the object 610 at the hit point 616, P, with a refracted angle of the lower direction vector 632, $t^l$, being computed with respect to the rotated normal vector 622, $n^l$.

Then, the rendering application 130 computes a width of the refracted ray cone 634 based on distances from the hit point 616, P, to lines 631 and 629 defined by the upper direction vector 632, $t^u$, and the lower direction vector 628, $t^l$, respectively, along a direction orthogonal to the direction vector 630, t. In some embodiments, the width of the refracted ray cone 634 is computed as $$w = w^u + w^l, \tag{3}$$

where $w^u$ is computed as the length along the direction that is orthogonal to the direction vector 630, t, from the hit point 616, P, to the line 631 defined by the upper direction vector 632, $t^u$, and $w^l$ is computed as the length along an opposite direction that is orthogonal to the direction vector 630, t, from the hit point 616, P, to the line 629 defined by the lower direction vector 628, $t^l$. In such cases, a line in the direction that is orthogonal to the direction vector 630, t, can be intersected with the line 631 defined by the upper direction vector 632, $t^u$, and a line in the opposite direction that is orthogonal to the direction vector 630, t, can be intersected with the line 629 defined by the lower direction vector 628, $t^l$, in order to compute the lengths $w^u$ and $w^l$.

In addition, the rendering application 130 can compute a half cone angle, denoted by $\alpha_2$, of the refracted ray cone 634 as half of the angle between the upper direction vector 632, $t^u$, and the lower direction vector 628, $t^l$, It should be noted that the refracted ray cone 634 can either be expanding or contracting. In some embodiments, the half cone angle $\alpha_2$ can be computed together with a sign indicating whether the refracted ray cone 634 is expanding or contracting as $$\alpha_2 = \tfrac{1}{2} \arccos(t^u \cdot t^l) \text{sign}(t_x^u t_y^l - t_y^u t_x^l), \tag{4}$$

where $\text{sign}(t_x^u t_y^l - t_y^u t_x^l)$ is part of a cross product in 2D that indicates, via a sign, whether the refracted ray cone 634 is expanding or contracting.

Although FIG. 6 is described with respect to the middle ray 603, the upper ray 607, and the lower ray 605 being refracted, in some cases, one or more such rays may be totally internally reflected. As described, total internal reflection can occur when (1) the angle of incidence a ray makes with the surface of an object is greater than a critical angle associated with a medium of the object and a surrounding medium, and (2) the ray is attempting to travel from an optically denser medium to an optically thinner medium. In some embodiments, when the middle ray of a ray cone is totally internally reflected, then the rendering application 130 generates a reflected ray cone rather than a refracted ray cone. The reflected ray cone can be generated in any technically feasible manner, including using well-known techniques. On the other hand, when the upper ray is totally internally reflected (but the middle ray is not totally internally reflected), then the rendering application 130 generates a refracted ray cone according to the technique described above, except the upper direction vector 632, $t^u$, of the refracted ray cone is computed as:

$$t^u = \frac{d^u - (n^u \cdot d^u) n^u}{\|d^u - (n^u \cdot d^u) n^u\|}. \tag{5}$$

Alternatively, n may be used in equation (5) instead of $n^u$. Similarly, when the lower ray is totally internally reflected (but the middle ray is not totally internally reflected), then the rendering application 130 can generate a refracted ray cone according to the technique described above, except the lower direction vector 628, $t^l$, of the refracted ray cone is computed as:

$$t^l = \frac{d^l - (n^l \cdot d^l)n^l}{\|d^l - (n^l \cdot d^l)n^l\|}. \quad (6)$$

Alternatively, n may be used in equation (6) instead of $n^l$.

Although described herein primarily with respect to perfect refractions, techniques disclosed herein may also be used for rough refractions when, e.g., a microfacet-based bidirectional transmittance distribution function (BTDF) is used to generate a randomized refracted direction based on surface roughness. In some embodiments, a half-vector used for refracting the incident direction of a ray may be used as a normal, because the half vector is the normal of the microfacet that is used to refract the ray. In such cases, techniques for stochastic evaluation of microfacet BTDFs can be used to generate the half-vector. In other embodiments, the half-vector may be calculated using:

$$n = \frac{\eta t + d}{\|\eta t + d\|} \quad (7)$$

Figure 7:
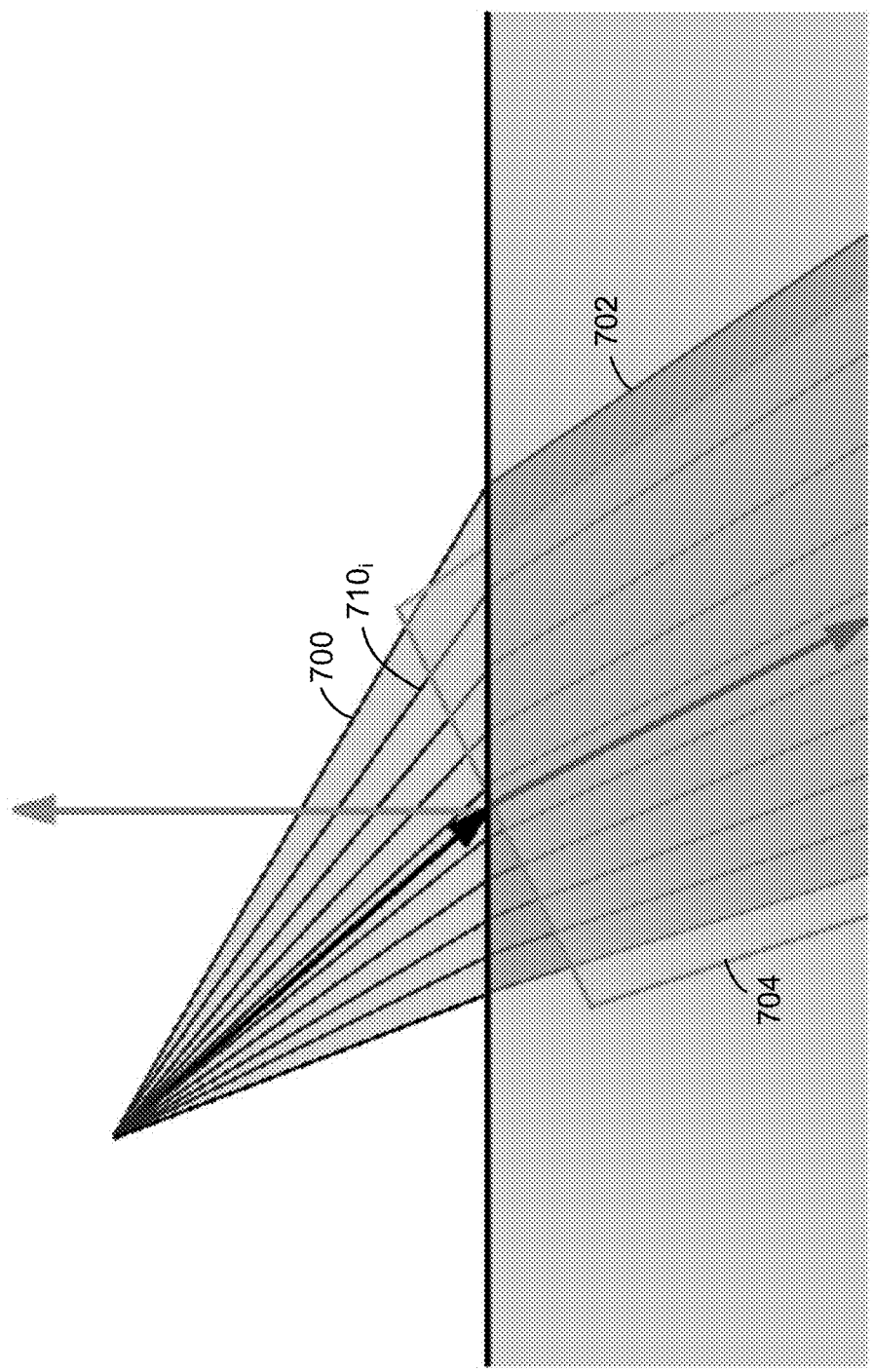
FIG. 7 illustrates an approximation of a refracted ray cone, according to various embodiments.

FIG. 7 illustrates an approximation of a refracted ray cone, according to various embodiments. As shown, a refracted ray cone 704 that is generated using the approach described above in conjunction with FIG. 6 is a close approximation of a refracted ray cone 702 generated by refracting multiple rays $710_i$ (referred to herein collectively as rays 710 and individually as a ray 710) of a ray cone 700. In particular, the refracted ray cone 704 grows at approximately the same rate as the refracted ray cone 702. As a result, the refracted ray cone 704 can be used to approximate a footprint of the refracted ray cone 702 without altering the direction of a refraction of a middle ray of the ray cone 700 as a middle ray of the refracted ray cone 704.

Illustratively, the geometry of the ray cone 700 differs significantly from the geometry of the refracted ray cone 702, and the refracted ray cone 704 only approximates the geometry of the refracted ray cone 702. In some embodiments, the rendering application 130 performs isotropic texture filtering prior to refractions and anisotropic texture filtering after refractions, in order to compensate for the approximations made using refracted ray cones. For example, anisotropic filtering could be performed to compensate for imperfections in the refracted ray cone 704 relative to the refracted ray cone 702. In other embodiments, only isotropic texture filtering may be performed. In some embodiments, textures may be sampled without performing texture filtering in some cases. For example, when the very first hit of a ray cone along a path is refractive, no texture filtering could be performed prior to the refraction.

Figure 8A:
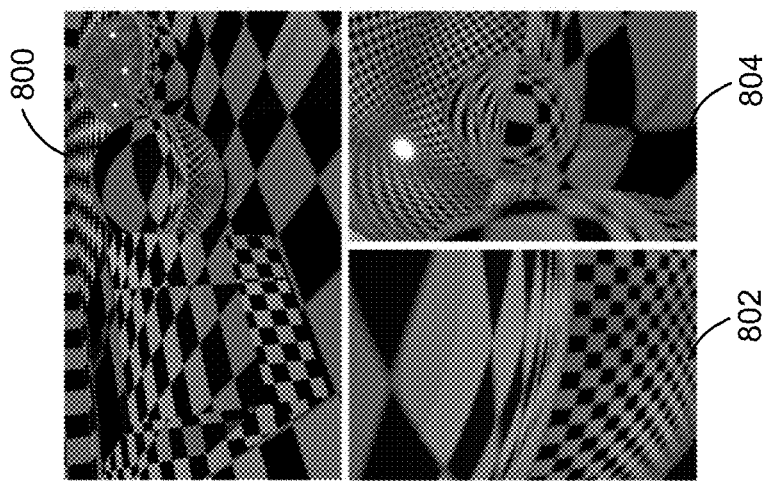
FIG. 8A illustrates an exemplar image rendered using refracted ray cones and isotropic texture filtering, according to various embodiments.

FIG. 8A illustrates an exemplar image 800 rendered using refracted ray cones and isotropic texture filtering, according to various embodiments. As shown, the image 800 depicts a virtual 3D scene that includes glass objects, and the image 800 is rendered from a view such that most of the scene is seen through the glass objects. Also shown are zoom-ins 802 and 804 of two regions within the image 800.

Figure 8B:
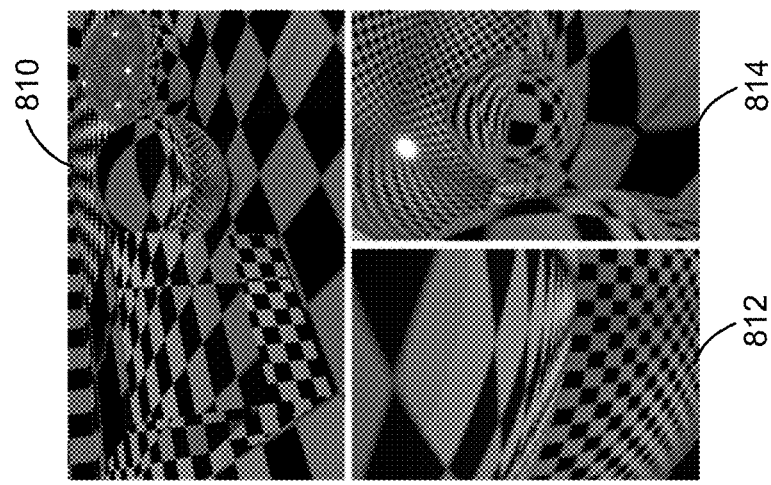
FIG. 8B illustrates an exemplar image rendered using refracted ray cones and anisotropic texture filtering, according to other various embodiments.

FIG. 8B illustrates an exemplar image 810 rendered using refracted ray cones and anisotropic texture filtering, according to other various embodiments. As shown, the exemplar image 810 was rendered by performing anisotropic texture filtering after refractions, as described above in conjunction with FIGS. 5 and 7. In some embodiments, anisotropic texture filtering may be performed after refractions to compensate for the approximations made using refracted ray cones. Also shown are zoom-ins 812 and 814 of two regions within the image 810.

Figure 8C:
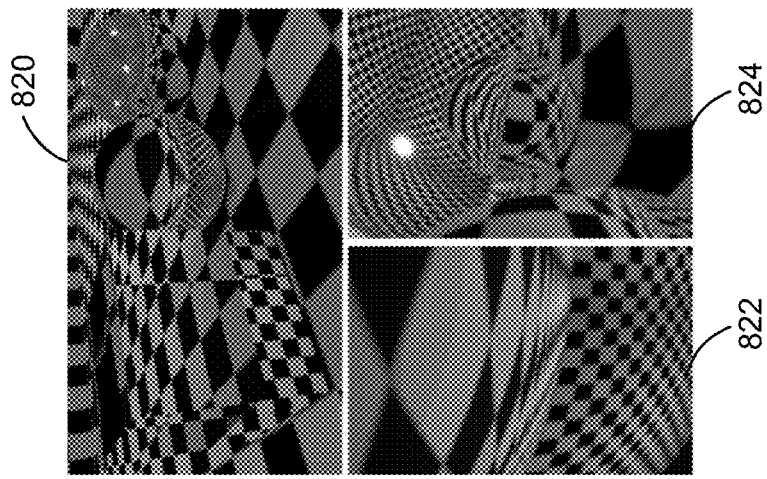
FIG. 8C illustrates an exemplar ground truth image, according to the prior art.

FIG. 8C illustrates an exemplar ground truth image 820, according to the prior art. The ground truth image 820 was generated by stochastically sampling a screen space ray cone through a pixel with 10k samples per pixel. Also shown are zoom-ins 822 and 824 of two regions within the ground truth image 820.

As shown in FIGS. 8A-C, the image 810 that is rendered using refracted ray cones and anisotropic texture filtering is closer to the ground truth image 820 than the image 800 that is rendered using refracted ray cones and isotropic texture filtering. In addition, anisotropic texture filtering produces results that are closer to the ground truth in the region in the zoom-in 812 than the region in the zoom-in 814, because ray cones model circular cones and the region in the zoom-in 814 requires more than circular cones.

Figure 9A:
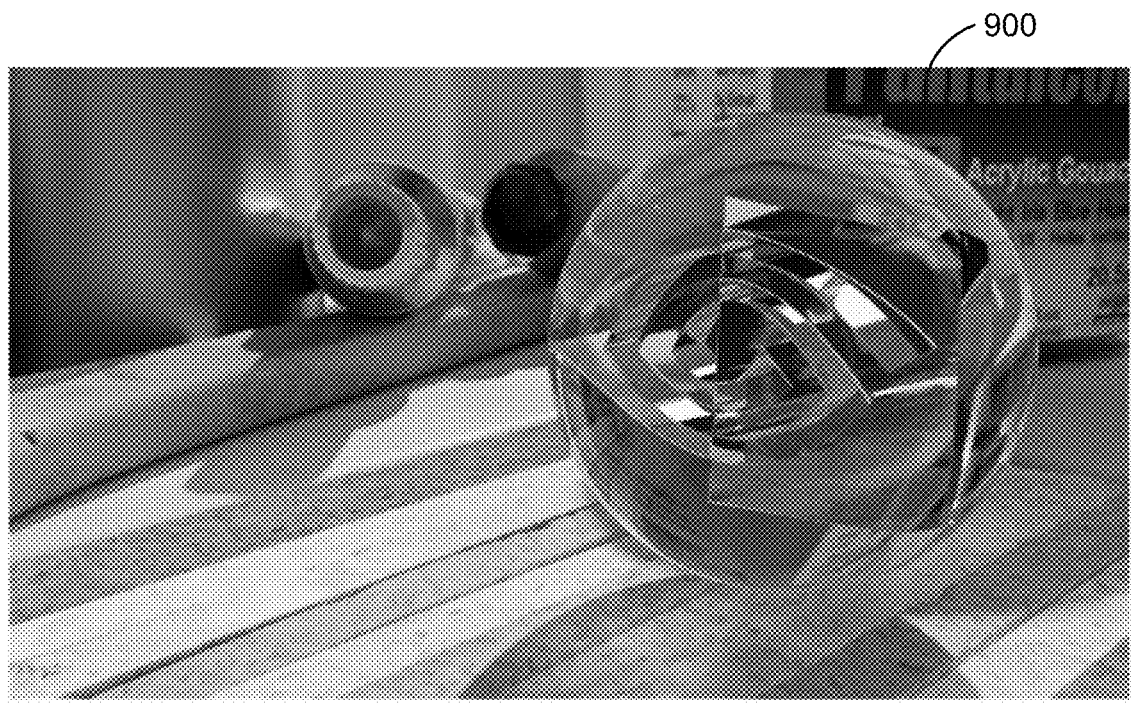
FIG. 9A illustrates an exemplar image rendered using refracted ray cones and isotropic texture filtering, according to various embodiments.
Figure 9B:
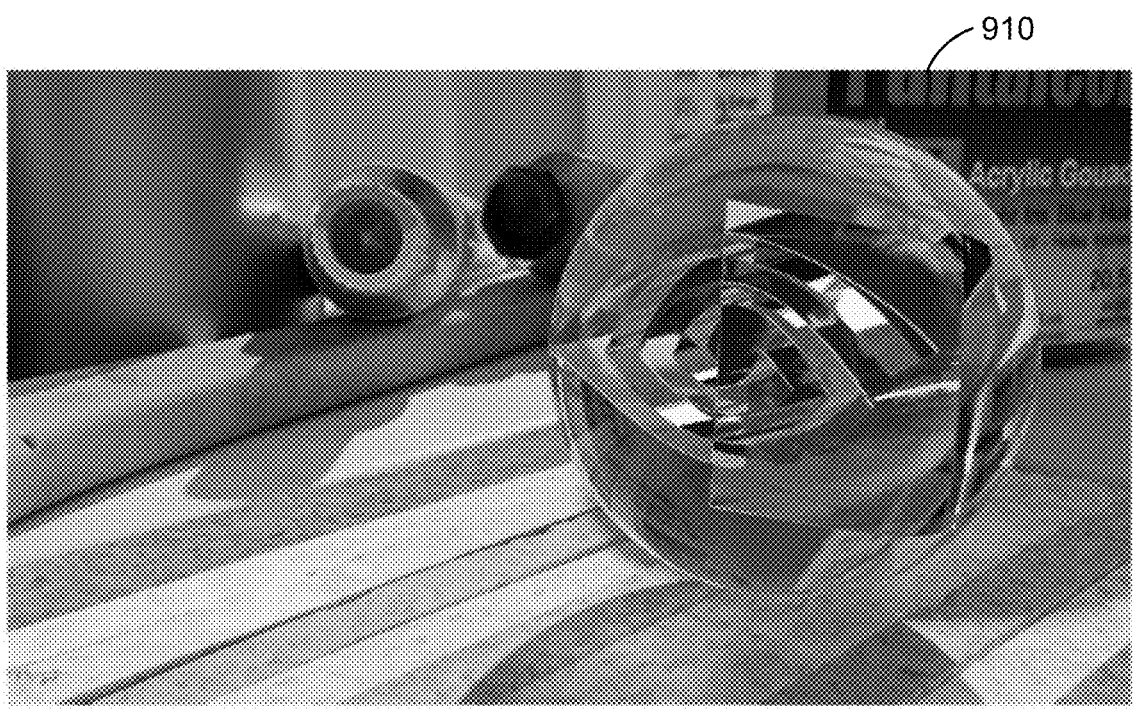
FIG. 9B illustrates an exemplar image rendered using full resolution textures, according to the prior art.

FIG. 9A illustrates an exemplar image 900 rendered using refracted ray cones and isotropic texture filtering, according to various embodiments, and FIG. 9B illustrates an exemplar image 910 rendered using full resolution textures (mip0), according to the prior art. As shown, the images 900 and 910 were rendered using 1000 samples per pixel (ssp). On the same hardware, the image 900 rendered using refracted ray cones and isotropic texture filtering can be rendered more quickly than the image 910 rendered using full resolution textures. For example, experience has shown that ray cone tracing with isotropic texture filtering, described above in conjunction with FIGS. 5-7, is typically approximately 10% faster than differential ray tracing with isotropic texture filtering and approximately 12% faster than differential ray tracing with anisotropic texture filtering. Further, the image 900 rendered using refracted ray cones and isotropic texture filtering is nearly visually identical to the image 910 rendered using full resolution textures.

Figure 10:
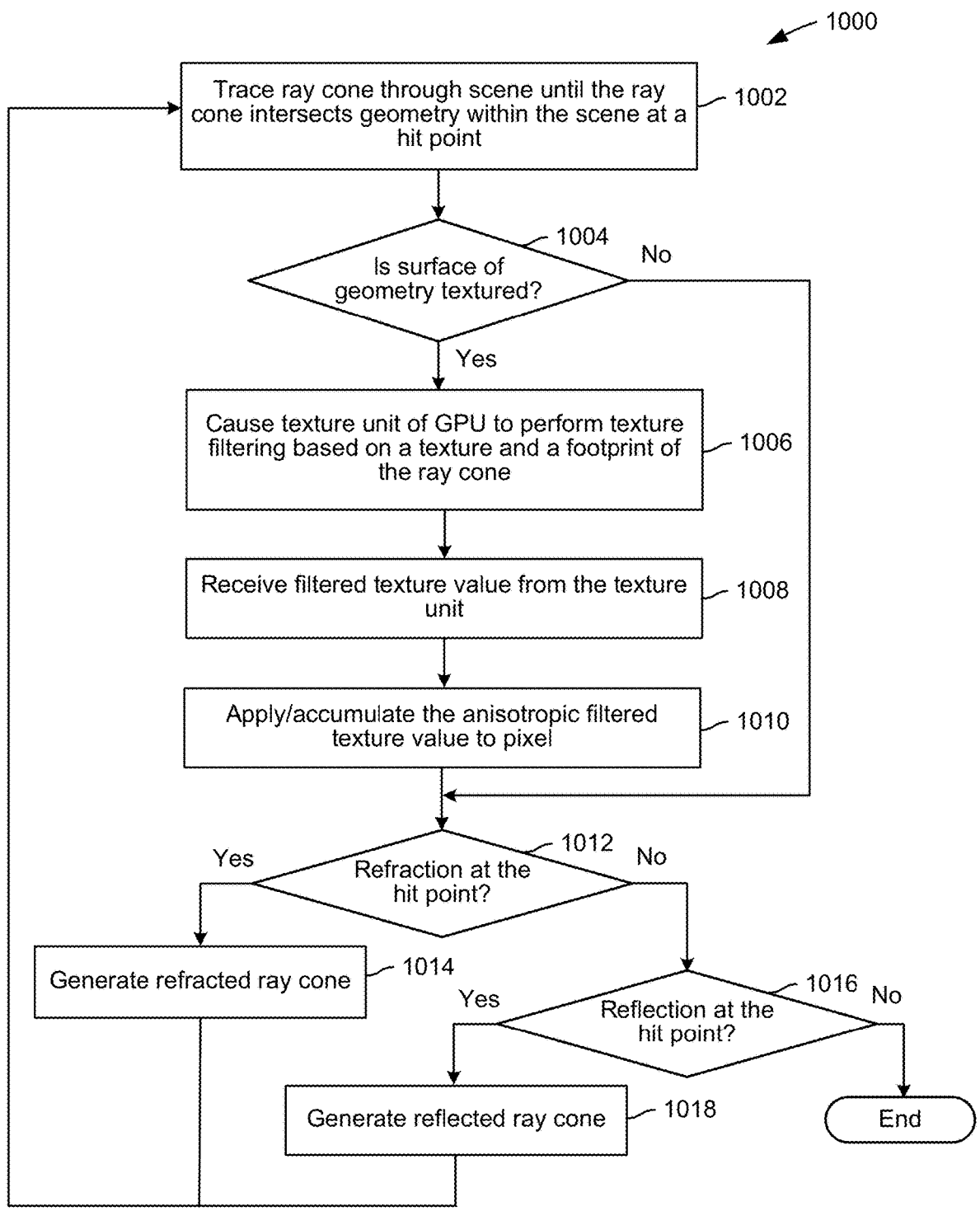
FIG. 10 is a flow diagram of method steps for computing a pixel color via a ray cone tracing technique that implements refracted ray cones, according to various embodiments.

FIG. 10 is a flow diagram of method steps for computing a pixel color via a ray cone tracing technique that implements refracted ray cones, according to various embodiments. Although the method steps are described in conjunction with the systems of FIGS. 1-4, persons skilled in the art will understand that any system configured to perform the method steps in any order falls within the scope of the present embodiments. Although described with respect to tracing a single ray cone, the method steps can be repeated to trace multiple ray cones when rendering an image.

As shown, a method 1000 begins at step 1002, where the rendering application 130 traces a ray cone through a scene until the ray cone intersects geometry within the scene at a hit point. In particular, the ray cone can be traced through a pixel in a screen space into the scene until the ray cone intersects a triangle in the geometry at the hit point.

At step 1004, the rendering application 130 determines whether the surface of the geometry at the hit point is textured. If the surface of the geometry at the hit point is textured, then, at step 1006, the rendering application 130 causes the texture unit of a GPU to perform texture filtering based on one or more textures associated with the surface of the geometry. Any technically feasible texture filtering may be performed, such as isotropic texture filtering or anisotropic texture filtering. In some embodiments, isotropic texture filtering is performed prior to refractions, and anisotropic texture filtering is performed subsequent to refractions in order to compensate for imperfections in refracted ray cones. In some embodiments, textures may be sampled without performing texture filtering in some cases. For example, when the very first hit of a ray cone along a path is refractive, no texture filtering could be performed prior to the refraction.

At step 1008, the rendering application 130 receives a filtered texture value from the texture unit of the GPU. The filtered texture value represents a texture color associated with the pixel in the screen space through which the ray cone was traced at step 1002.

At step 1010, the rendering application 130 applies or accumulates the filtered texture value to the pixel through which the ray cone was traced at step 1002. The applied or accumulated texture filter value contributes to the color of the pixel in a rendered image. As described, the rendered image can be, e.g., an image or frame within a video game or film, an image generated by an architectural or design application or any other application, or the like. Although described herein with respect to applying or accumulating the anisotropic filtered texture value to the pixel, in other embodiments, the filtered texture value may be used in any technically feasible manner.

At step 1012, the rendering application 130 determines whether refraction occurs. In some embodiments, determining whether refraction occurs includes determining whether an angle of incidence that a middle ray of the ray cone makes with the surface of an object that the ray cone hits is greater than a critical angle associated with a medium of the object and a surrounding medium when the middle ray is attempting to travel from an optically denser medium to an optically thinner medium. Beyond the critical angle, light rays are totally internally reflected, rather than refracted. Determining whether refraction occurs can further include determining whether the middle ray is reflected when the middle ray is attempting to travel from an optically thinner medium to an optically denser medium.

Figure 11:
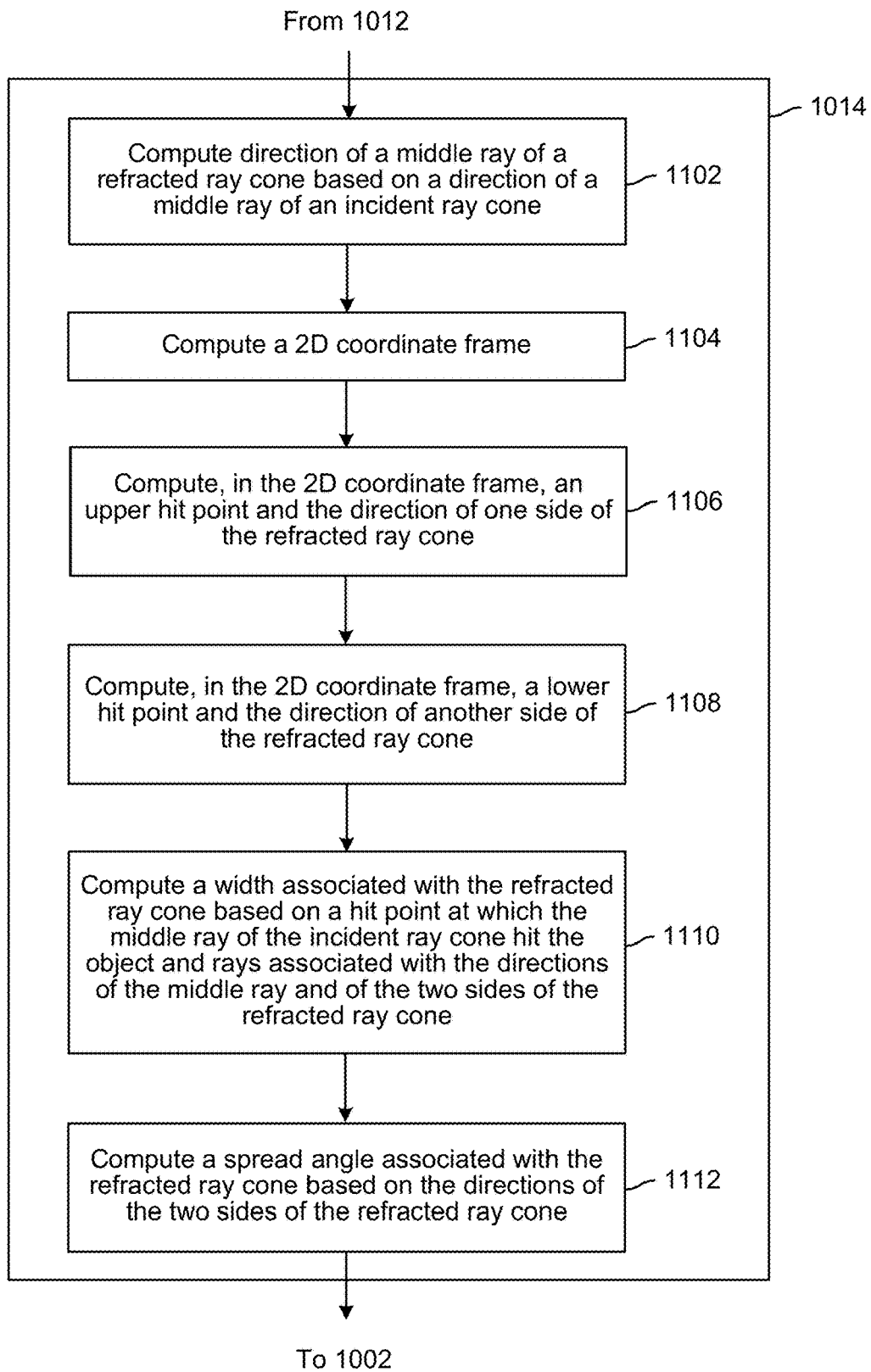
FIG. 11 is a flow diagram of method steps for generating a refracted ray cone, according to various embodiments.

If refraction occurs, then at step 1014, the rendering application 130 generates a refracted ray cone. FIG. 11 is a flow diagram of method steps for generating the refracted ray cone at step 1014, according to various embodiments. Although the method steps are described in conjunction with the systems of FIGS. 1-4, persons skilled in the art will understand that any system configured to perform the method steps in any order falls within the scope of the present embodiments.

As shown, at step 1102, the rendering application 130 computes a direction of a middle ray of the refracted ray cone based on a direction of the middle ray of the incident ray cone. As described, the direction of the middle ray of the refracted ray cone can be computed using Snell's law in some embodiments.

At step 1104, the rendering application 130 computes a 2D coordinate frame. As described, in some embodiments, the 2D coordinate frame can be defined using the hit point as an origin, a direction of a vector that is normal to the surface of the object that the ray cone hits as one axis, and a direction of a vector that is in a same plane as a middle ray of the ray cone and tangent to the surface of the object as another axis.

At step 1106, the rendering application 130 computes, in the 2D coordinate frame, an upper hit point and the direction of one side of the refracted ray cone. In some embodiments, the rendering application 130 may first determine whether an upper ray associated with a corresponding side of the incident ray cone is refracted or totally internally reflected. If the upper ray is refracted, then the direction of the side of the refracted ray cone can be computed based on the direction of the corresponding side of the incident ray cone and a rotated normal vector, as described above in conjunction with FIG. 6. In addition, the rotated normal vector can be computed based on a curvature of the surface of the object that the ray cone hits. On the other hand, if the upper ray is totally internally reflected, then the direction of the side of the refracted ray cone can be computed according to equation 5.

At step 1108, the rendering application 130 computes, in the 2D coordinate frame, a lower hit point and the direction of another side of the refracted ray cone. Similar to step 1106, in some embodiments, the rendering application 130 may determine whether a lower ray associated with another corresponding side of the incident ray cone is refracted or totally internally reflected. If the lower ray is refracted, then the direction of the other side of the refracted ray cone can be computed based on the direction of the other corresponding side of the incident ray cone and another rotated normal vector, as described above in conjunction with FIG. 6. On the other hand, if the lower ray is totally internally reflected, then the direction of the other side of the refracted ray cone can be computed according to equation 6.

At step 1110, the rendering application 130 computes a width associated with the refracted ray cone based on the hit point at which the middle ray of the incident ray cone hit the object and rays associated with the directions of the middle ray and of the two sides of the refracted ray cone. In some embodiments, the width of the refracted ray cone is computed based on distances from the hit point to rays defined by direction vectors associated with the two sides of the refracted ray cone along a direction orthogonal to the middle ray of the refracted ray cone, as described above in conjunction with FIG. 6.

At step 1112, the rendering application 130 computes a spread angle associated with the refracted ray cone based on the directions of the two sides of the refracted ray cone. In some embodiments, the spread angle can be computed as a half cone angle along with a sign indicating whether the refracted ray cone is expanding or contracting, as described above in conjunction with FIG. 6.

Returning to FIG. 10, if the rendering application 130 determines at step 1012 that refraction does not occur, then the method 1000 continues to step 1016, where the rendering application 130 determines whether reflection occurs based on whether the surface of the object that the ray cone hits is reflective.

If reflection does not occur, then the method 1000 ends. On the other hand, if reflection occurs, then the method 1000 continues to step 1018, where the rendering application 130 generates a reflected ray cone. The reflected ray cone can be generated in any technically feasible manner, including using well-known techniques.

The method 1000 then returns to step 1002, where the rendering application 130 traces the (reflected or refracted) ray cone through the scene until the ray cone intersects geometry within the scene at another hit point.

Although described herein primarily with respect to refraction at a surface, in some cases, an incident ray may be below the perturbed normal of a surface. To handle such cases, in some embodiments, the incident vector associated with a ray may be clamped to be at most 90 degrees away from the normal of a surface.

In sum, the disclosed techniques provide improved ray cone tracing techniques that implement refracted ray cones. In the improved ray cone tracing techniques, when a ray cone being traced through a virtual 3D scene hits a surface of geometry within the scene and undergoes refraction, a refracted ray cone is generated by (1) computing, in a 3D coordinate frame, the direction of a middle ray of the refracted ray cone and the directions of upper and lower sides of the refracted ray cone; and (2) given such computations, further computing a width of the refracted ray cone and a spread angle of the refracted cone. Then, the 3D refracted ray cone is traced through the scene. In addition, isotropic texture filtering can be performed prior to generating the refracted ray cone, and anisotropic texture filtering can be performed using the refracted ray cone and any subsequent ray cones, to determine the color of a pixel in a rendered image.

At least one technological advantage of the disclosed techniques relative to the prior art is that the disclosed techniques implement refracted ray cones that can be used to render more realistic-looking images of virtual scenes that include objects constructed from media that cause light to refract. In addition, the disclosed techniques use ray cone tracing, which is less computationally expensive than many ray tracing techniques, such as differential ray tracing, that can be used to trace refracted rays. These technological advantages represent one or more technological improvements over prior art approaches.

1. In some embodiments, a computer-implemented method for rendering one or more graphics images comprises tracing a ray cone through a three-dimensional (3D) graphics scene, generating a refracted ray cone based on the ray cone and a two-dimensional (2D) coordinate frame, and rendering a graphics image based on the refracted ray cone.

2. The computer-implemented method of clause 1, wherein generating the refracted ray cone comprises computing a first hit point and a direction of a middle ray associated with the refracted ray cone based on a direction of a middle ray associated with the ray cone, computing, in the 2D coordinate frame, a second hit point and a direction of a first side of the refracted ray cone based on a direction of a first side of the ray cone and a first rotated normal vector, and computing, in the 2D coordinate frame, a third hit point and a direction of a second side of the refracted ray cone based on a direction of a second side of the ray cone and a second rotated normal vector.

3. The computer-implemented method of clauses 1 or 2, further comprising computing the first rotated normal vector and the second rotated normal vector based on a curvature of an object hit by the ray cone in the 3D graphics scene.

4. The computer-implemented method of any of clauses 1-3, further comprising computing a width associated with the refracted ray cone based on the first hit point, a first ray associated with the direction of the first side of the refracted ray cone, and a second ray associated with the direction of the second side of the refracted ray cone.

5. The computer-implemented method of any of clauses 1-4, further comprising computing an angle associated with the refracted ray cone based on the direction of the first side of the refracted ray cone and the direction of the second side of the refracted ray cone.

6. The computer-implemented method of any of clauses 1-5, wherein rendering the graphics image comprises performing one or more isotropic texture filtering operations based on the refracted ray cone.

7. The computer-implemented method of any of clauses 1-6, wherein rendering the graphics image comprises performing one or more isotropic texture filtering operations based on the ray cone, and performing one or more anisotropic texture filtering operations based on the refracted ray cone.

8. The computer-implemented method of any of clauses 1-7, further comprising determining that refraction occurs at a hit point where the ray cone intersects an object in the 3D graphics scene.

9. The computer-implemented method of any of clauses 1-8, wherein the graphics image is rendered in association with a video game, a film, or an architectural or design application.

10. In some embodiments, one or more non-transitory computer-readable media store program instructions that, when executed by at least one processor, cause the at least one processor to perform the steps of tracing a ray cone through a three-dimensional (3D) graphics scene, generating a refracted ray cone based on the ray cone and a two-dimensional (2D) coordinate frame, and rendering a graphics image based on the refracted ray cone.

11. The one or more non-transitory computer-readable media of clause 10, wherein generating the refracted ray cone comprises computing a first hit point and a direction of a middle ray associated with the refracted ray cone based on a direction of a middle ray associated with the ray cone, computing, in the 2D coordinate frame, a second hit point and a direction of a first side of the refracted ray cone based on a direction of a first side of the ray cone and a first rotated normal vector, and computing, in the 2D coordinate frame, a third hit point and a direction of a second side of the refracted ray cone based on a direction of a second side of the ray cone and a second rotated normal vector.

12. The one or more non-transitory computer-readable media of clauses 10 or 11, the steps further comprising computing the first rotated normal vector and the second rotated normal vector based on a curvature of an object that the ray cone hits in the 3D graphics scene.

13. The one or more non-transitory computer-readable media of any of clauses 10-12, the steps further comprising computing a width associated with the refracted ray cone based on the first hit point, a first ray associated with the direction of the first side of the refracted ray cone, and a second ray associated with the direction of the second side of the refracted ray cone.

14. The one or more non-transitory computer-readable media of any of clauses 10-13, the steps further comprising computing an angle associated with the refracted ray cone based on the direction of the first side of the refracted ray cone and the direction of the second side of the refracted ray cone.

15. The one or more non-transitory computer-readable media of any of clauses 10-14, the steps further comprising determining at least one of the middle ray associated with the ray cone, a third ray associated with the direction of the first side of the ray cone, or a fourth ray associated with the direction of the second side of the ray cone is totally internally reflected.

16. The one or more non-transitory computer-readable media of any of clauses 10-15, the steps further comprising computing the 2D coordinate frame based on a middle ray associated with the ray cone.

17. The one or more non-transitory computer-readable media of any of clauses 10-16, wherein rendering the graphics image comprises performing one or more texture filtering operations based on the ray cone and the refracted ray cone.

18. The one or more non-transitory computer-readable media of any of clauses 10-17, wherein the one or texture filtering operations comprise one or more isotropic texture filtering operations that are performed prior to generating the refracted ray cone, and one or more anisotropic texture filtering operations that are performed subsequent to generating the refracted ray cone.

19. In some embodiments, a system comprises one or more memories storing instructions, and one or more processors that are coupled to the one or more memories and, when executing the instructions, are configured to trace a ray cone through a three-dimensional (3D) graphics scene, generate a refracted ray cone based on the ray cone and a two-dimensional (2D) coordinate frame, and render a graphics image based on the refracted ray cone.

20. The system of clause 19, wherein the one or more memories and the one or more processes are included in one or more computing systems that provide at least one of a virtualized environment or a cloud computing environment.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering one or more graphics images, the method comprising:
   tracing a ray cone through a three-dimensional (3D) graphics scene;
   computing a two-dimensional (2D) coordinate frame based on a normal to a surface at a first hit point where the ray cone intersects the surface within the 3D graphics scene, and a projection of a direction vector associated with the ray cone;
   generating a refracted ray cone based on the ray cone and the 2D coordinate frame; and
   rendering a graphics image based on the refracted ray cone.

2. The computer-implemented method of claim 1, wherein generating the refracted ray cone comprises:
   computing the first hit point and a direction of a middle ray associated with the refracted ray cone based on a direction of a middle ray associated with the ray cone;
   computing, in the 2D coordinate frame, a second hit point and a direction of a first side of the refracted ray cone based on a direction of a first side of the ray cone and a first rotated normal vector; and
   computing, in the 2D coordinate frame, a third hit point and a direction of a second side of the refracted ray cone based on a direction of a second side of the ray cone and a second rotated normal vector.

3. The computer-implemented method of claim 2, further comprising computing the first rotated normal vector and the second rotated normal vector based on a curvature of the surface.

4. The computer-implemented method of claim 2, further comprising computing a width associated with the refracted ray cone based on the first hit point, a first ray associated with the direction of the first side of the refracted ray cone, and a second ray associated with the direction of the second side of the refracted ray cone.

5. The computer-implemented method of claim 2, further comprising computing an angle associated with the refracted ray cone based on the direction of the first side of the refracted ray cone and the direction of the second side of the refracted ray cone.

6. The computer-implemented method of claim 1, wherein rendering the graphics image comprises performing one or more isotropic texture filtering operations based on the refracted ray cone.

7. The computer-implemented method of claim 1, wherein rendering the graphics image comprises:
   performing one or more isotropic texture filtering operations based on the ray cone; and
   performing one or more anisotropic texture filtering operations based on the refracted ray cone.

8. The computer-implemented method of claim 1, further comprising determining that refraction occurs at the first hit point.

9. The computer-implemented method of claim 1, wherein the graphics image is rendered in association with a video game, a film, or an architectural or design application.

10. One or more non-transitory computer-readable media storing program instructions that, when executed by at least one processor, cause the at least one processor to perform the steps of:
    tracing a ray cone through a three-dimensional (3D) graphics scene;
    computing a two-dimensional (2D) coordinate frame based on a normal to a surface at a first hit point where the ray cone intersects the surface within the 3D graphics scene, and a projection of a direction vector associated with the ray cone;
    generating a refracted ray cone based on the ray cone and the 2D coordinate frame; and
    rendering a graphics image based on the refracted ray cone.

11. The one or more non-transitory computer-readable media of claim 10, wherein generating the refracted ray cone comprises:
    computing the first hit point and a direction of a middle ray associated with the refracted ray cone based on a direction of a middle ray associated with the ray cone;
    computing, in the 2D coordinate frame, a second hit point and a direction of a first side of the refracted ray cone based on a direction of a first side of the ray cone and a first rotated normal vector; and
    computing, in the 2D coordinate frame, a third hit point and a direction of a second side of the refracted ray cone based on a direction of a second side of the ray cone and a second rotated normal vector.

12. The one or more non-transitory computer-readable media of claim 11, the steps further comprising computing the first rotated normal vector and the second rotated normal vector based on a curvature of the surface.

13. The one or more non-transitory computer-readable media of claim 11, the steps further comprising computing a width associated with the refracted ray cone based on the first hit point, a first ray associated with the direction of the first side of the refracted ray cone, and a second ray associated with the direction of the second side of the refracted ray cone.

14. The one or more non-transitory computer-readable media of claim 11, the steps further comprising computing an angle associated with the refracted ray cone based on the direction of the first side of the refracted ray cone and the direction of the second side of the refracted ray cone.

15. The one or more non-transitory computer-readable media of claim 11, the steps further comprising determining at least one of the middle ray associated with the ray cone, a third ray associated with the direction of the first side of the ray cone, or a fourth ray associated with the direction of the second side of the ray cone is totally internally reflected.

16. The one or more non-transitory computer-readable media of claim 10, wherein rendering the graphics image comprises performing one or more texture filtering operations based on the ray cone and the refracted ray cone.

17. The one or more non-transitory computer-readable media of claim 16, wherein the one or texture filtering operations comprise one or more isotropic texture filtering operations that are performed prior to generating the refracted ray cone, and one or more anisotropic texture filtering operations that are performed subsequent to generating the refracted ray cone.

18. A system, comprising:
    one or more memories storing instructions; and
    one or more processors that are coupled to the one or more memories and, when executing the instructions, are configured to:
      trace a ray cone through a three-dimensional (3D) graphics scene,
      compute a two-dimensional (2D) coordinate frame based on a normal to a surface at a first hit point where the ray cone intersects the surface within the 3D graphics scene, and a projection of a direction vector associated with the ray cone,
      generate a refracted ray cone based on the ray cone and the 2D coordinate frame, and
      render a graphics image based on the refracted ray cone.

19. The system of claim 18, wherein the one or more memories and the one or more processes are included in one or more computing systems that provide at least one of a virtualized environment or a cloud computing environment.

* * * * *